United States Patent
Licht et al.

(10) Patent No.: US 10,600,110 B2
(45) Date of Patent: Mar. 24, 2020

(54) REAL-TIME ORDER NOTIFICATION PROCESSING

(71) Applicant: NCR Corporation, Duluth, GA (US)

(72) Inventors: Yehoshua Zvi Licht, Alpharetta, GA (US); Joseph Arnold White, Encinitas, CA (US)

(73) Assignee: NCR Corporation, Atlanta, GA (US)

( * ) Notice: Subject to any disclaimer, the term of this patent is extended or adjusted under 35 U.S.C. 154(b) by 417 days.

(21) Appl. No.: 15/237,469

(22) Filed: Aug. 15, 2016

(65) Prior Publication Data

US 2018/0047090 A1 Feb. 15, 2018

(51) Int. Cl.
*G06Q 30/06* (2012.01)
*G06Q 20/20* (2012.01)
*G06Q 20/32* (2012.01)

(52) U.S. Cl.
CPC ....... *G06Q 30/0637* (2013.01); *G06Q 20/202* (2013.01); *G06Q 20/3274* (2013.01); *G06Q 20/3278* (2013.01)

(58) Field of Classification Search
CPC ........ G06Q 30/06; G06Q 30/00; G06Q 30/02; G06F 17/30
USPC .............. 705/14.23, 28, 7.12, 7.13
See application file for complete search history.

(56) References Cited

U.S. PATENT DOCUMENTS

| | | | | |
|---|---|---|---|---|
| 7,024,387 B1* | 4/2006 | Nieboer | ................ | G06Q 40/00 705/37 |
| 7,096,189 B1* | 8/2006 | Srinivasan | ....... | G06Q 10/06315 705/7.25 |
| 7,657,534 B2* | 2/2010 | Kirkegaard | .......... | G06Q 10/063 705/7.12 |
| 9,159,095 B1* | 10/2015 | Smith | .................. | G06F 16/252 |
| 9,811,836 B2* | 11/2017 | Brouhard | ............... | G06Q 30/02 |
| 2002/0123957 A1* | 9/2002 | Notarius | ................ | G06Q 30/06 705/37 |
| 2002/0178232 A1* | 11/2002 | Ferguson | ........... | G06Q 30/0251 709/217 |
| 2004/0138781 A1* | 7/2004 | Sacks | ................... | G06Q 10/087 700/245 |
| 2004/0205644 A1* | 10/2004 | Shaughnessy | .......... | G06F 17/24 715/255 |
| 2005/0065817 A1* | 3/2005 | Mihai | .................. | A61B 5/0002 705/2 |
| 2006/0253586 A1* | 11/2006 | Woods | ................ | G06F 16/9535 709/226 |
| 2006/0265344 A1* | 11/2006 | Woods | ................ | G06F 16/9535 |
| 2009/0070175 A1* | 3/2009 | Bauqhman | .......... | G06Q 10/0631 705/7.12 |
| 2009/0259553 A1* | 10/2009 | Carroll | .................... | G06Q 20/20 705/15 |
| 2011/0125566 A1* | 5/2011 | McLaughlin | .......... | G06Q 20/20 705/14.23 |
| 2011/0173041 A1* | 7/2011 | Breitenbach | ..... | G06Q 10/06311 705/7.13 |
| 2011/0238555 A1* | 9/2011 | Rosenthal | .............. | G06Q 40/04 705/37 |

(Continued)

*Primary Examiner* — Oluseye Iwarere
(74) *Attorney, Agent, or Firm* — Schwegman, Lundberg & Woessner

(57) ABSTRACT

Real-time order information is published to a server as an order is being placed for a customer and while the order is being fulfilled. The server dynamically pushes in real time the change in state of the order as the order is being fulfilled to a mobile device being operated by the customer.

15 Claims, 5 Drawing Sheets

(56) References Cited

U.S. PATENT DOCUMENTS

| | | | | | |
|---|---|---|---|---|---|
| 2012/0022944 | A1* | 1/2012 | Volpi | .................... | G06Q 30/00 705/14.53 |
| 2012/0191522 | A1* | 7/2012 | McLaughlin | .......... | G06Q 50/01 705/14.23 |
| 2012/0265696 | A1* | 10/2012 | Tuchman | ............. | G06Q 30/016 705/304 |
| 2013/0144701 | A1* | 6/2013 | Kulasooriya | ........ | G06Q 20/202 705/14.24 |
| 2013/0166401 | A1* | 6/2013 | Algozer | ................ | G06Q 30/06 705/16 |
| 2013/0204637 | A1* | 8/2013 | Vanderveen | ........... | G06Q 10/00 705/2 |
| 2013/0317921 | A1* | 11/2013 | Havas | ................ | G06Q 30/0633 705/15 |
| 2014/0172577 | A1* | 6/2014 | Rephlo | ................ | G06Q 20/322 705/14.64 |
| 2015/0248696 | A1* | 9/2015 | Fernandez | ......... | G06Q 30/0253 705/14.51 |
| 2015/0339675 | A1* | 11/2015 | Tuchman | ............... | H04L 63/104 705/7.16 |
| 2015/0356664 | A1* | 12/2015 | Mackler | ............. | G06Q 30/0635 705/26.81 |
| 2016/0034876 | A1* | 2/2016 | Speiser | ................. | G06Q 30/06 705/21 |
| 2016/0109954 | A1* | 4/2016 | Harris | ..................... | G06F 3/017 345/156 |
| 2016/0171439 | A1* | 6/2016 | Ladden | ............. | G06Q 10/0832 705/340 |
| 2016/0180369 | A1* | 6/2016 | Thomas | ............. | G06Q 30/0231 705/14.25 |
| 2016/0335686 | A1* | 11/2016 | AthuluruTIrumala | ...................... | G06Q 30/0613 |
| 2016/0357363 | A1* | 12/2016 | Decker | .................. | G06F 3/165 |
| 2017/0221072 | A1* | 8/2017 | AthuluruTIrumala | ...................... | G06Q 30/016 |

* cited by examiner

REAL-TIME ORDER NOTIFICATION PROCESSING

BACKGROUND

Transaction and order fulfillment processing have become automated in a variety of manners through utilization and deployment of technology. In fact, transactions with businesses can now occur over a variety of different communication channel, such as: websites, kiosks, mobile phones, and the like.

As a result, consumers engage in transactions with businesses through a variety of devices and interfaces. Further, backend business systems have automated fulfillment and tracking technology for purposes of improved transaction throughput and business efficiency. For instance, package delivery, luggage handling, and even mail delivery utilizes bar codes that are scanned during each stage of package handling. Some of these businesses expose that status of package handling to the consumers, such that the consumers can log into a web site and receive a current status and location of their anticipated packages.

Some businesses have even deployed technology to track different stages of food preparation, such that consumers can interact with a website interface to determine what stage their food order is in at any given moment in time.

Most of this technology is passive in the sense that consumers receive notifications only when requested by the consumer. Furthermore, in most situations, the consumer is unable to change or alter orders even with the technology to request current status updates for the orders.

Additionally, the present technology provided to consumers is proprietary in nature, which means the interfaces are dependent on the business providing the technology to the consumer. This means that the consumer has to subscribe and interact with multiple different interfaces and not all businesses even offer such technology.

Still further, the existing technology does not permit any easy mechanism by which the consumer can quickly identify his/her order, modify the order, and collect items to conclude a transaction; rather, the consumer has to repeatedly log into the interface and/or manually provide identification to business personnel to do these types of activities with existing approaches.

SUMMARY

In various embodiments, real-time order notification processing is presented.

According to an embodiment, a method for real-time order notification processing is provided. Specifically, in an embodiment, a change in state to an order while the order is actively being fulfilled by an enterprise is received. Next, the change is dynamically delivered in real time to a mobile device being operated by a customer associated with the order.

DETAILED DESCRIPTION

Figure 1A:
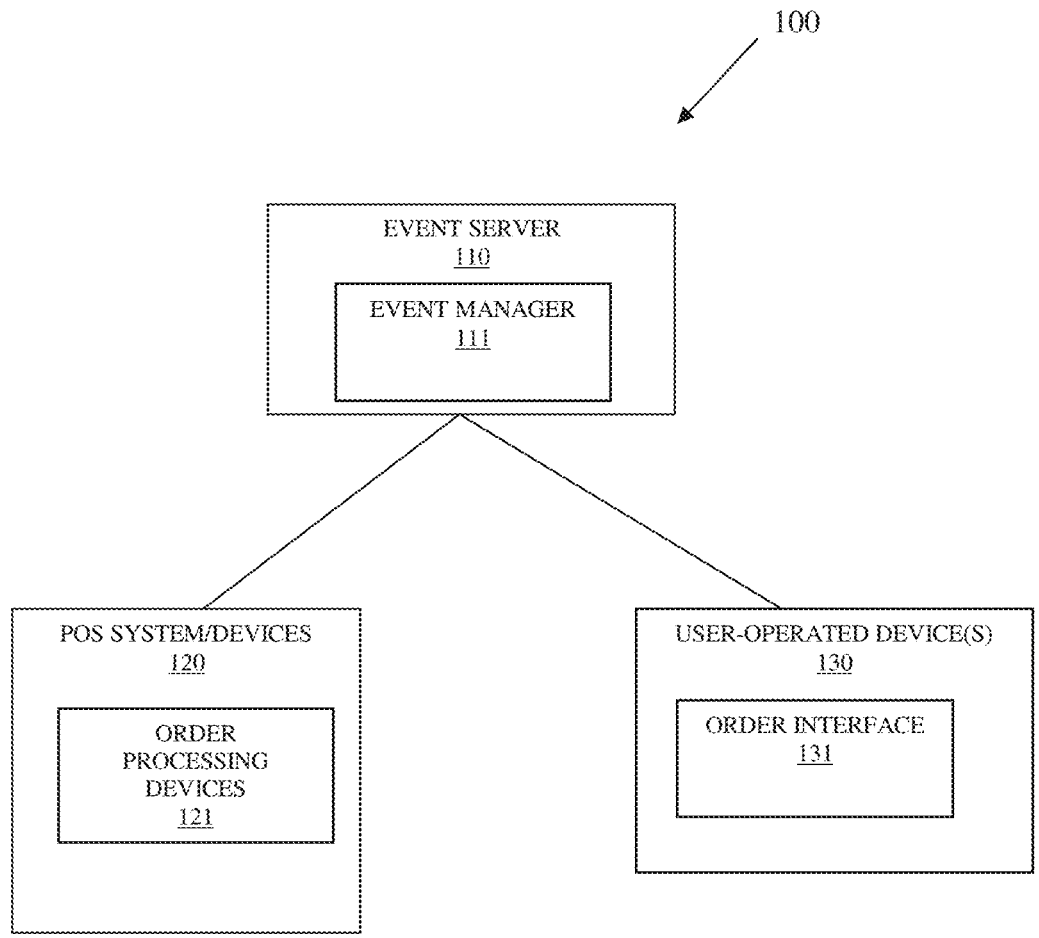
FIG. 1A is a diagram of a system for real-time order notification processing, according to an example embodiment.

FIG. 1A is a diagram of a system 100 for real-time order notification processing, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the location context aware computing techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for real-time order notification processing can be implemented in all, or some combination of the components shown in different hardware computing devices having one or more hardware processors.

The system 100 includes an event server 110 having an event manager 111, a variety of Point-Of-Sale (POS) systems 120 having a variety of order processing devices 121, and at least one user-operated device 130 having processing capabilities for processing or remotely accessing (remote from the device 130) one or more order interfaces 131.

The event server 130 is a server or a collection of one or more servers remotely located from one another and cooperating as a cloud server.

The event manager 131 is one or more software modules that execute as executable instructions on one or more processors of the server 130.

The event manager 131 provides a variety of interfaces accessible/exposed to the POS system/devices 120 and the order processing devices 121. Moreover, the event manager 131 provides an interface accessible/exposed to the user-operated device 130 and the order interface 131.

Initially, a POS system/device 120 subscribes or registers for sending and receiving event notification with the event manager 111. The exposed interface of the event manager 111 is adapted to allow the POS system/devices 120 to custom-define business-specific order fulfillment and transaction-related events with the event manager 111. These defined events are published by the order processing devices 121 to the event manager in real time as items are being handled for order fulfillment within an enterprise associated with the POS system/devices 120.

That is, the POS system/devices 120 and the order processing devices 121 send in real time order fulfillment events for ongoing transactions. Each event includes a tag or defined structure published and defined to the event manager 111 during the initial subscription and set-up processing for the POS system/devices 120. Following each tag or defined structure is a payload that can include a variety of information being passed by the order processing devices 121 to the event manager, such as a unique transaction identifier, a unique customer identifier, a unique item identifier (for a specific item of the transaction), and an enterprise-specific description, such as but not limited to: order received, item pulled from warehouse (shelf), item packaged, and the like.

In an embodiment, the descriptions and item detail (description of the item) may be pulled from a table by the event manager 111 using the tag or tag numbers (published by the POS system/devices 121) as a table index. In this way, the descriptions can be controlled and updated by the POS system/devices 121 by using the exposed interface of the event manager to update the table.

It is noted that a variety of other approaches can be used as well, such as a relational database, etc., that permits meaningful descriptions to be resolved in real time for item fulfillment notification processing. That is, the event manager 111 is generic enough that published order fulfillment data can be done in a manner that supports full control to remain with the POS systems/devices 120, such that the event manager 111 can support multiple line-of-businesses and/or enterprises and their own proprietary order fulfillment and transaction processing systems.

The order processing devices 121 can include a variety of enterprise specific devices, such as but not limited to: handheld scanners, terminals, mobile phones, card readers, sensors, and others. These devices 121 permit reporting activity in an automated fashion to their own POS system/devices 120, which are then sent to the event manager 111 based on the published structure that the POS system/devices 120 published with the event manager 111. Thus, as items for a transaction are being processed internal to an enterprise, the current status or state of the order is being updated in real time through with the POS system/devices 120 and provided to the event manager 111.

The event manager 111 also permits a subscription and relevant interfaces exposed to individual customers and their devices 130. The customer operating one or more customer devices 130 uses an exposed order interface 131 to subscribe to events published by enterprises from the POS system/devices 120. This can be done by the customer on an enterprise-specific bases, done on a customer-defined grouping of enterprises, or done for any enterprise that is subscribed to the event manager 111.

Once the customer is registered and subscribed to receive real-time order notifications, the event manager 111 broadcasts events being received in real time for order fulfillment stares or statuses as they are received from the POS system/devices 120.

Thus, when a change in order fulfillment for an ongoing transaction with an enterprise changes state, the event manager 111 broadcasts the change in state and the order interface 131 identifies the customer-specific order fulfillment state change details and displays those details in real-time on the user device 131.

In an embodiment, the user device 130 is a smart watch (as discussed below with the discussion of the FIG. 1B). It is noted, however, that in other embodiments the user device 130 can be one of: an intelligent appliance (with network connectivity and processing capabilities), a laptop, a desktop, a network connected vehicle, goggles, and the like. Also, in an embodiment, the user can receive the real-time order fulfillment state change data on multiple user devices simultaneously.

The real-time notification for order fulfillment state also includes a novel Quick Response (QR) code generated by either the event manager 111 or the POS system/devices 120. In the case where the event manager 111 generates the QR code, the QR code is in a format that can be read and processed by the POS system/devices 120. The QR code is encoded for identifying and retrieving an entire transaction of the customer that is relevant to the real-time order fulfillment change in state notification. This permits the customer to have the QR code scanned from a display of the user-device 130 by a POS device 120. This permits the customer to identify his transaction at an enterprise where the order is to be picked up and/or paid for. The QR code can also be automatically presented (through a scan at a POS device 120 for order modification (adding an item, deleting an item, or modifying an item or item quantity for the transaction).

In an embodiment, when the customer is presented on the display with a real-time order notification for a change in state of the order, the customer taps the information presented and the order interface 131 responds by providing the QR code.

In an embodiment, the QR code can also permit the customer to replay the order from creation up until the real-time state change notification. For example, activating the QR code with a user touch may display the following, as one example, on the display of the user device 130: transaction initiated on date X for items Y and Z at store A; on date X+1 a quantity for Y was increased by the customer, on date X+2 new item Q was added, on X+3 items X and Y pulled from shelves, etc. It is also noted that the time of day may be displayed as well. So, the order interface 131 interacts with the event manager 111 and can replay an order on the display of the user device 130.

In an embodiment, double tapping of the QR code (or some other defined interface action of the order interface (131) can automatically launch a browser interface to the enterprise POS system 120 and automatically provide the order identifier to recall the customer's order and permit the customer to directly interface with the POS system 120 (through the browser interface) for purposes of making automated changes to the order. (This can be done when the POS system/device 120 registers and subscribes with the event manager 111 by providing a Uniform Resource Locator (URL) link to the event manager 111; an Applicant Programming Interface (API) or identification of a location within the URL for providing the order identifier can also be defined for the event manager 111 to automatically communicate the order identifier on behalf of the customer based on the double tap of the QR code.)

In an embodiment, other features with respect to the QR code for the order can be provided as well. For example, a tap and hold on the QR code can initiate a voice call with the enterprise servicing the order (again the voice number or Voice-Over Internet Protocol (VOIP) address can be configured upon subscription of the POS system 120 with the event manager 110).

In an embodiment, the customer can send a Near-Field Communication (NFC) code or data packet from the user device 130 to the POS system/devices 120 to recall and identify the order for pickup or modification. In another case, any wireless code or data packet can be sent from the order interface 131 of the user device 130 to the POS system/device to recall and identify the order for pickup or modification.

The system 100 can produce and process a variety of consumer specific scenarios. As one example, consider a consumer that places an order for groceries that are to be picked up subsequently at a local grocery store. Suppose the consumer ordered a specific type of bread, bananas, eggs, and milk. Suppose further that when the store clerk is pulling the items from the grocery shelf that the specific type of bread is not in stock and instead the clerk pulls a different bread and notes that in the mobile scanner (POS device 120) that the clerk uses to scan the items from the order as the order is being filled at the grocery store. The grocery store POS system 120 relays the order changes when the clerk is scanning to the event manager 111. The event manager 111 pushes the changes to the consumers watch 130. The consumer sees the change on the watch 130 taps the information once and receives a QR code for the order. Next the consumer double taps the QR code and is presented with a web-based interface for the order with the grocery store and changes the clerk-selected brand of bread to a different brand of bread based on the original brand being out of stock. This is relayed through the POS system 120 to the POS device 120 of the clerk while the clerk is continuing his journey through the store for the milk relevant to the order. The clerk then backtracks and gets the new brand desired by the customer. When the last item in the order is picked, the customer again gets notification on the watch 130. The customer subsequently comes to the store; taps his order on his watch display screen; the QR code is presented on the watch display screen; the customer places the display under a POS checkout device 120; a clerk is dispatched to retrieve the groceries for the order; and the customer is provided his groceries by the clerk.

Again, this is but one scenario as an infinite number of scenarios are achievable with the teachings presented herein for real-time order notification processing.

The system 100 provides a variety of novel benefits and improvements in existing retail technology, such as but not limited to:
1) permitting a customer to receive active real-time state changes occurring with a customer order;
2) permitting a customer to quickly recall and identify his/or order to an existing POS system/device through an automatically generated code;
3) permitting a customer to make real-time changes to an order; and
4) permitting a customer to replay a history from beginning to then-existing state of the customer's order.

Figure 1B:
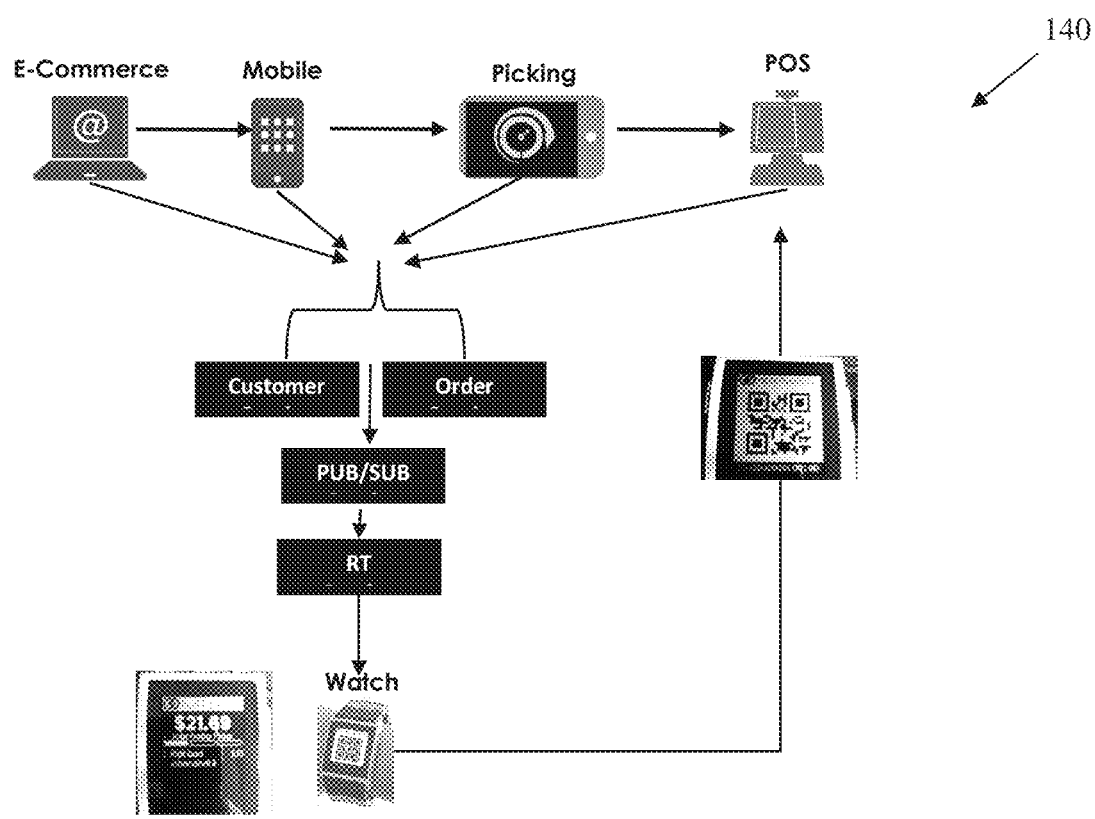
FIG. 1B is a diagram a sample architecture for practicing real-time order notification processing according to an example embodiment.

FIG. 1B is a diagram a sample architecture 140 for practicing real-time order notification processing according to an example embodiment.

The architecture illustrates a variety of devices (120 and 130) that can be used by an enterprise in taking an order from a customer, fulfilling and tracking the progress of the order, and concluding the order with the customer. For example, such devices (120 and 130) can include a laptop (or desktop), a mobile phone, a table, and POS terminal.

Events relevant to the order are communicated in real time from the enterprise devices to the event manager 110 as the order is being filled within the enterprise (and based on what was published and configured by the enterprise) and communicated from the event manager 110 in real time to the customer (again based on what was subscribed to by the customer) on the customer watch 130. The order interface 131 of the watch permits the customer to tap the real time notification to generate a QR code, which can be scanned at an enterprise kiosk (type of POS device 120) for picking the items of the order up and concluding a transaction with the enterprise. Moreover, as noted above, the order interface 131 can permit the QR code to be double tapped to allow the customer to change the order in real time directly with the enterprise web-based POS device 120.

These and other embodiments are no discussed with reference to the FIGS. 2-4.

Figure 2:
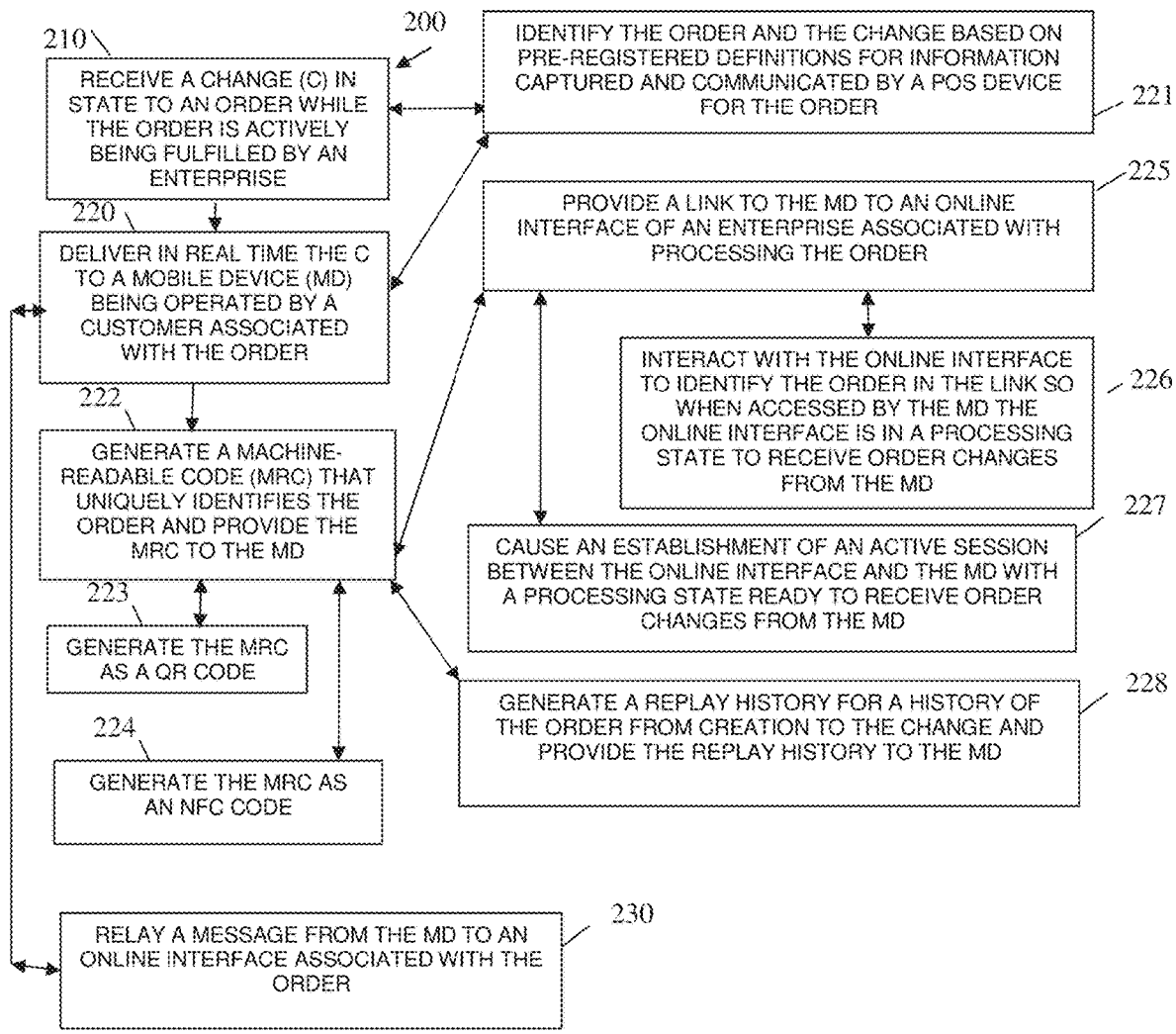
FIG. 2 is a diagram of a method for real-time order notification processing, according to an example embodiment.

FIG. 2 is a diagram of a method 200 for real-time order notification processing, according to an example embodiment. The software module(s) that implements the method 300 is referred to as an "real-time order notification manager." The real-time order notification manager is implemented as executable instructions programmed and residing within memory and/or a non-transitory computer-readable (processor-readable) storage medium and executed by one or more hardware processors of a hardware computing device. The processors of the device that executes the real-time order notification manager are specifically configured and programmed to process the real-time order notification manager. The real-time order notification manager has access to one or more networks during its processing. The networks can be wired, wireless, or a combination of wired and wireless.

In an embodiment, the device that executes the real-time order notification manager is a server 110.

In an embodiment, the device that executes the location context aware manager is a cloud processing environment having a variety of hardware devices logically organized as a single processing environment.

In an embodiment, real-time order notification manager is the event manager 111.

At 210, the real-time order notification manager receives a change in a state to an order while the order is actively being fulfilled by an enterprise. The order may include 1 or two or more items being purchased by a consumer through the enterprise.

The term "user," "consumer," and "customer" may be used interchangeably and synonymously herein above and below.

The manner in which the initial order is taken can vary. For instance, the initial order may be taken in person with a clerk of the enterprise, may be taken through an online website interface of the enterprise, and/or may be placed at a kiosk associated with the enterprise.

Moreover, the enterprise has previously registered for order event publication with the real-time order notification manager in the manners discussed above with the FIGS. 1A and 1B. Additionally, the consumer operating a mobile device has previously subscribed to receiving even notifications for the enterprise with which the order was taken with the real-time order notification manager in the manners discussed above with the FIGS. 1A and 1B.

At 220, the real-time order notification manager delivers in real time the change to a mobile device being operated by a customer associated with the order. In an embodiment, the mobile device executes the order interface 131 and/or the method 300 discussed below with the FIG. 3. In an embodiment, the mobile device is a watch as shown in the FIG. 1B. In an embodiment, the mobile device is an intelligent appliance, a tablet, a mobile phone, or a laptop.

In an embodiment of 210 and 220, at 221, the real-time order notification manager identifies the order and the change based on pre-registered definitions for information captured and communicated by POS devices for the order within the enterprise. This can be done through tags and/or data structure definitions with enterprise controlled tables as discussed above with the FIGS. 1A and 1B.

In an embodiment, at 222, the real-time order notification manager generates a machine-readable code (MRC) that unique identifies the order and provides the MRC to the mobile device of the customer.

In an embodiment of 222 and at 223, the real-time order notification manager generates the MRC as a QR code.

In an embodiment of 222 and at 224, the real-time order notification manager generates the MRC as an NFC code.

In an embodiment of 222 and at 225, the real-time order notification manager provides a line to the mobile device to an online interface of an enterprise associated with processing the order. In an embodiment, the link is an URL.

In an embodiment of 225 and at 226, the real-time order notification manager interacts with the online interface to identify the order in the link so when accessed by the mobile device, the online interface is in a processing state that is ready to receive order changes from the mobile device being operated by the customer.

In an embodiment of 225 and at 227, the real-time order notification manager causes an establishment of an active session between the online interface and the mobile device (such as through order interface 131) with a preconfigured processing state for the online interface ready to receive order changes from the mobile device being operated by the customer.

In an embodiment of 222 and at 228, the real-time order notification manager generates a replay history for a history of the order from creation of the order (initial placement of the order by the customer) to the change in state that was communicated at 210 to the mobile device. The replay history is provided by the real-time order notification manager to the mobile device. This was discussed above with reference to the FIGS. 1A and 1B.

According to an embodiment, at 230, the real-time order notification manager relays a message from the mobile device to an online interface associated with the order. This embodiment assumes bidirectional communication between the real-time order notification manager and the online interface of the enterprise and can be achieved through exposed Applicant Programming Interface (API) calls between the real-time order notification manager and the online interface and between the order interface 131 of the mobile device and the real-time order notification manager.

Figure 3:
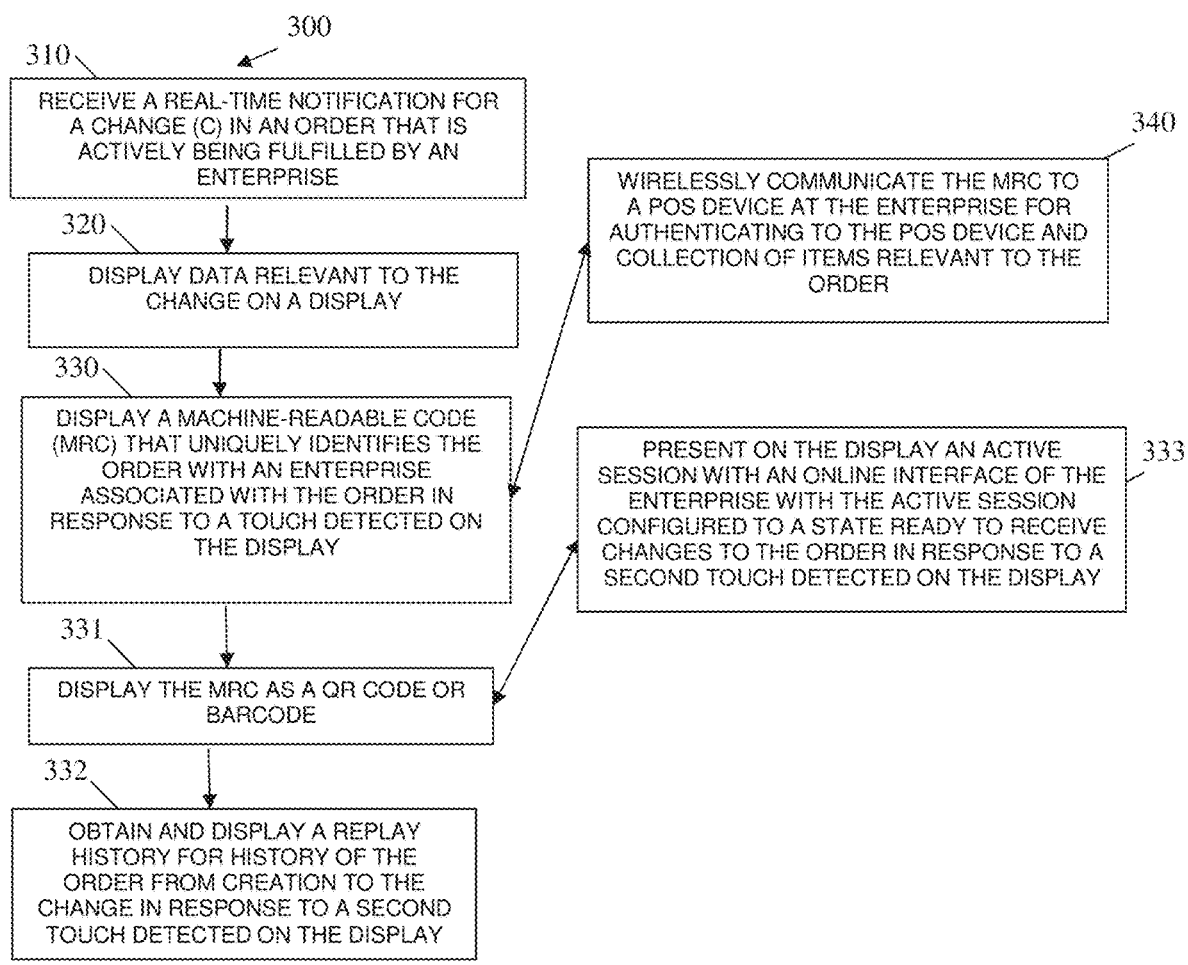
FIG. 3 is a diagram of another method for real-time order notification, according to an example embodiment.

FIG. 3 is a diagram of another method 300 for real-time order notification, according to an example embodiment. The software module(s) that implements the method 300 is referred to as an "mobile order notification agent." The mobile order notification agent is implemented as executable instructions programmed and residing within memory and/or a non-transitory computer-readable (processor-readable) storage medium and executed by one or more hardware processors of a hardware device. The processors of the device that executes the mobile order notification agent are specifically configured and programmed to process the mobile order notification agent. The mobile order notification agent has access to one or more networks during its processing. The networks can be wired, wireless, or a combination of wired and wireless.

In an embodiment, the device that executes the mobile order notification agent is the user-operated device 130.

In an embodiment, the device that executes the mobile order notification agent is a watch (such as the watch shown in the FIG. 1B).

In an embodiment, the device that executes the mobile order notification agent is one of: an intelligent appliance, a vehicle, a tablet, a laptop, and goggles.

In an embodiment, the mobile order notification agent is the order interface 131.

In an embodiment, the mobile order notification agent interacts with the event manager 111, the method 200, or a combination of the event manager 111 and the method 200.

At 310, the mobile order notification agent receives a real-time notification for a change to an order that is actively being fulfilled by an enterprise on behalf of a customer. The change can be any action taken with respect to the order by a POS device of the enterprise that is published to the event manager 111 or the method 200 (as discussed above).

At 320, the mobile order notification agent displays data relevant to the notification on a display of the mobile device. In an embodiment, the display is a watch display in wireless communication to a mobile phone that executes the mobile order notification agent.

According to an embodiment, at 330, the mobile order notification agent displays a MRC that uniquely identifies the order with an enterprise associated with the order in response to a touch detected on the display. In an embodiment, the mobile order notification agent generates the MRC. In an embodiment, the event manager 111 or the method 200 generates the MRC and provides back to the mobile order notification agent for displaying.

In an embodiment of 330 and at 331, the mobile order notification agent displays the MRC as a QR code or a barcode.

In an embodiment of 331 and at 332, the mobile order notification agent obtains and displays a replay history for a history of the order from creation to the change in response to a second touch detected on the display. The replay history may be obtained by the mobile order notification agent from the event manager 111 or the method 200.

In an embodiment of 331 and at 333, the mobile order notification agent presents on the display an active session with an online interface of the enterprise with the active session configured to a state ready to receive changes to the order in response to a second touch detected on the display. This permits the customer to make real-time order changes while the order is in progress or being fulfilled by the enterprise by connecting the customer through the mobile device with the online ordering interface of the enterprise.

In an embodiment, at 340, the mobile order notification agent wirelessly communicates the MRC to a POS device at the enterprise for authenticating to the POS device and collection of items relevant to the order. Here, this can be the QR code being scanned at a POS device (kiosk or clerk-operated terminal) from the display of the mobile device or can be an NFC code tapped on the POS device. The permits automated customer identification and order identification for retrieval at the enterprise or an enterprise store location.

It is to be noted that throughout the discussion herein, the mobile device being operated by the customer may be multiple devices wirelessly communicating with one another, such as what was discussed above where the mobile device is a phone but the display through which the customer interacts and receives real-time order notifications on is a display of a watch that is in wireless communication with the customer's mobile device.

Figure 4:
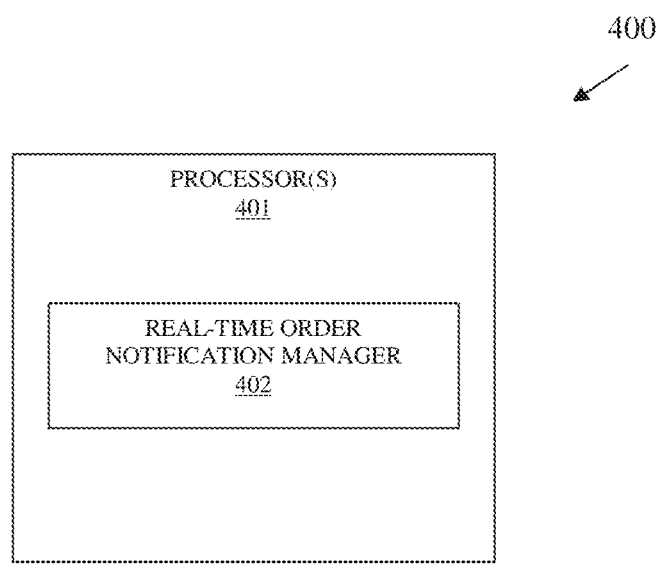
FIG. 4 is a diagram of a system for real-time order notification processing, according to an example embodiment.

FIG. 4 is a diagram of a system 400 for real-time order notification processing, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all, any, or some combination of the processing discussed above with the FIGS. 1A-1B and 2-3.

The system 400 includes at least one hardware processor 401 and a real-time order notification manager 402.

In an embodiment, the hardware processor 401 is part of the server 110.

In an embodiment, the hardware processor is part of a cloud processing environment.

The real-time order notification manager 402 is configured to: execute on the processor 401, receive real-time changes made to an order while an order is being processed by Point-Of-Sale (POS) devices of an enterprise, and communicate in real-time the changes to a mobile device operated by a consumer associated with the order.

In an embodiment, the mobile device is a watch. In an embodiment, the mobile device is a combination mobile phone and a watch. In an embodiment, the mobile device is one of: an intelligent appliance, a tablet, and a laptop.

In an embodiment, the real-time order notification manager 402 is further configured to: interact with a mobile agent processing on the mobile device to: generate a QR code that uniquely identifies the order, generate a replay history for a history of the order from creation to a then-existing state of the order, and link the mobile device to an online system of an enterprise associated with the order for receiving order changes communicated from the mobile device In an embodiment, the real-time order notification manager 402 is the event manager 111.

In an embodiment, the real-time order notification manager 402 is the method 200.

In an embodiment, the real-time order notification manager 402 is a combination of: some or all of the event manager 111 and the method 200.

In an embodiment, the mobile agent is the order interface 131.

In an embodiment, the mobile agent is the method 300.

In an embodiment, the mobile agent is a combination of the order interface 131 and the method 300.

In an embodiment, the real-time order notification manager 402 is deployed as a Software as a Service (SaaS) over a network.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   registering, by executable instructions that are executed by a hardware processor from a non-transitory computer-readable storage medium, events through a Point-Of-Sale (POS) interface that defines each event as a tag that is to be followed by a specific payload relevant to order processing by a specific business;
   storing, by the executable instructions, the events in a table;
   receiving, by the executable instructions, a change in state to an order while the order is actively being fulfilled by an enterprise based on received events from a POS device and matched to selective ones of the events in the table; and
   delivering, by the executable instructions, in real time the change to a mobile device being operated by a customer associated with the order;
   receiving, by the executable instructions, a response from the mobile device indicating that the customer tapped the change on the mobile device;
   encoding, by the executable instructions, an order identifier for the order, a customer identifier for the customer, the change, and the state in a Quick Response (QR) code based on the receiving of the response; and
   providing, by the executable instructions, the QR code to the mobile device, wherein when the QR code is scanned or provided from the mobile device to the POS device, the POS device reads the QR code, recalls the order, and causes the mobile device to launch an interface as a browser interface on the mobile device, populates the interface with order details for the order, and connects the mobile device to the POS device allowing customer interaction to make changes to the order through an existing POS interface associated with the POS device.

2. The method of claim 1, wherein receiving further includes identifying the order and the change from the received events.

3. The method of claim 2, wherein delivering further includes communicating real-time data provided by the POS device with the change based on particular events and those events associated payloads.

4. The method of claim 1 further comprising, providing a link to the mobile device to an online interface of an enterprise associated with processing the order.

5. The method of claim 4, wherein providing further includes interacting with the online interface to identify the order in the link so when accessed by the mobile device the online interface is in a processing state to receive order changes from the mobile device.

6. The method of claim 4 further comprising, causing an establishment of an active session between the online interface and the mobile device with a processing state ready to receive order changes from the mobile device.

7. The method of claim 1 further comprising, receiving a second response from the mobile device indicating the customer tapped the QR code on the mobile device, and providing to the mobile device a replay history for a history of the order from creation to the change, wherein the replay history is presented on the mobile device.

8. The method of claim 1 further comprising, relaying a message from the mobile device to an online interface associated with the order.

9. A method, comprising:
receiving, by executable instructions executed by a hardware processor of a mobile device from a non-transitory computer-readable storage medium, a real-time notification for a change in an order that is actively being fulfilled by an enterprise;
displaying, by the executable instructions, data relevant to the change on a display;
receiving, by the executable instructions, a response indicating that the data was tapped by an operator of the mobile device;
requesting, by the executable instructions, a Quick Response (QR) encoded with a user identifier for the user, an order identifier for the user, and the change;
obtaining, by the executable instructions, the QR code based on the requesting;
receiving, by the executable instructions, a touch on the QR code presented on the display from the user;
providing, by the executable instructions, an interface for making changes to the order based on the receiving of the touch;
identifying, by the executable instructions, a double-tap selection on the QR code from the user; and
automatically launching, by the executable instructions responsive to the double-tap selection, a browser interface that interacts with an existing interface of a Point-Of-Sale (POS) system that is processing the order and automatically populating the browser interface with order details for the order.

10. The method of claim 9 further comprising, obtaining and displaying a replay history for a history of the order from creation to the change in response to a different touch detected on the display.

11. The method of claim 9 further comprising, presenting on the display an active session with the POS system through the browser interface with the active session configured to a state ready to receive changes to the order in response to additional touches and inputs made on the display.

12. The method of claim 9 further comprising, wirelessly communicating the QR code to a POS device at the enterprise for authenticating to the POS device and a collection of items relevant to the order.

13. A system, comprising:
a hardware processor;
a non-transitory computer-readable storage medium having executable instructions representing a real-time order notification manager; and the real-time order notification manager when executed by the hardware processor from the non-transitory computer-readable storage medium causes the hardware processor to:
register events through a Point-Of-Sale (POS) interface that defines each event as a tag that is to be followed by a specific payload relevant to order processing by a specific business;
store the events in a table;
receive real-time changes made to an order while an order is being processed by POS devices of an enterprise by matching receive events that are received from the POS interface with the selective ones of the events in the table;
communicate in real-time the changes to a mobile device operated by a consumer associated with the order;
receive a touch indication that was made on a display of the mobile device to touch the changes by a user that operates the mobile device;
encode a user identifier for the user, an order identifier for the order, and the changes in a Quick Response (QR) code based on the touch indication;
receive a tap indication that was made on the display of the mobile device to the QR code; and
instruct the mobile device to automatically launch a browser interface for interaction with an existing interface associated with the POS devices and automatically populated with order details for the order, wherein the browser interface permits the consumer to make changes to the order through interactions of the browser interface with the existing interface of the POS devices.

14. The system of claim 13, wherein the real-time order notification manager when executed by the hardware processor from the non-transitory computer-readable storage medium causes the hardware processor further causes the hardware processor to: interact with a mobile agent processing on the mobile device to:
a) generate a replay history for a history of the order from creation to a then-existing state of the order based on a double tap on the QR code made by the user.

15. The system of claim 13, wherein the mobile device is a processor-enabled watch.

* * * * *